Figure 1:
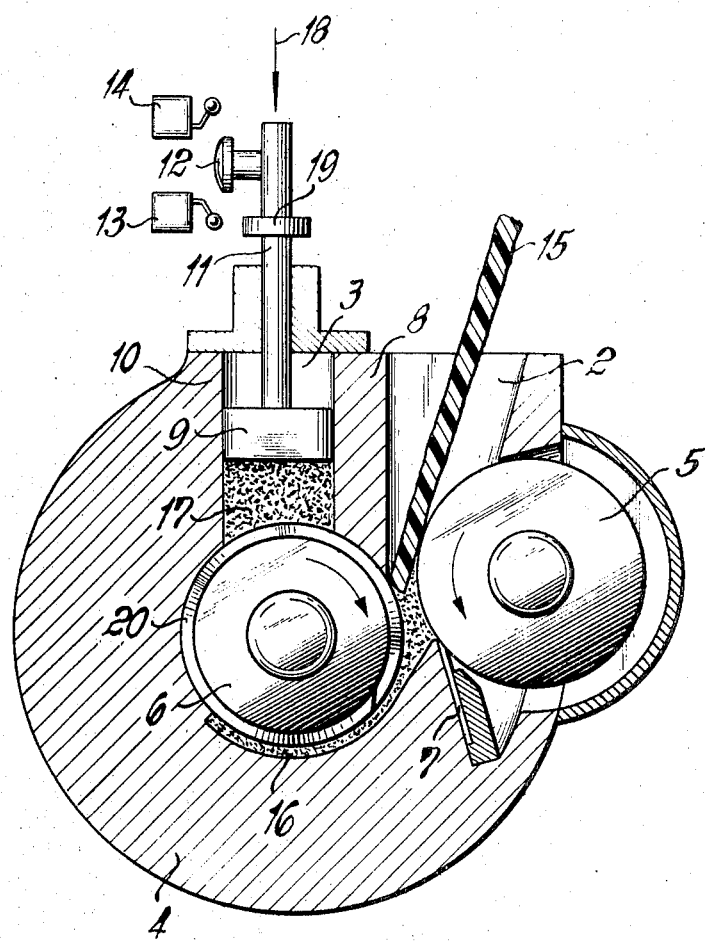

United States Patent [19]
Brand

[11] 3,785,527
[45] Jan. 15, 1974

[54] APPARATUS TO CONTROL FEED OF MATERIAL TO AN EXTRUDER

[75] Inventor: Wilhelm Brand, Hannover, Germany

[73] Assignee: Hermann Berstorff Maschinenbau GmbH, Hannover-Kleefeld, Germany

[22] Filed: Apr. 10, 1973

[21] Appl. No.: 349,683

[30] Foreign Application Priority Data
Apr. 14, 1972 Germany.................. P 22 18 087.6

[52] U.S. Cl.................................. 222/56, 222/280
[51] Int. Cl............................................. G05g 9/100
[58] Field of Search.................. 222/56, 58, 64, 65, 222/67, 412, 270, 271, 279, 280, 384, 267, 52, 14, 55

[56] References Cited
UNITED STATES PATENTS
2,568,332  9/1951  Genovese.......................... 222/56 X
2,569,969  10/1951  Baer................................ 222/412 X
3,225,963  12/1965  Arpajian......................... 222/56 X Primary Examiner—Robert B. Reeves
Assistant Examiner—Charles A. Marmor
Attorney—Donald D. Jeffery

[57] ABSTRACT

Control apparatus to control feed of material to an extruder, particularly rubber or plastics material, comprising a housing for a feed screw, a hopper formed as a material feed aperture in the housing and divided into two portions by a baffle seated with a tight seal on the feed screw, a first of the two portions receiving material to be extruded and feeding said material into said second portion, which second portion contains a piston to maintain the material in the second portion in compacted form, means feeding material to the first portion being controlled in dependence upon the position of the piston in the second portion.

4 Claims, 2 Drawing Figures

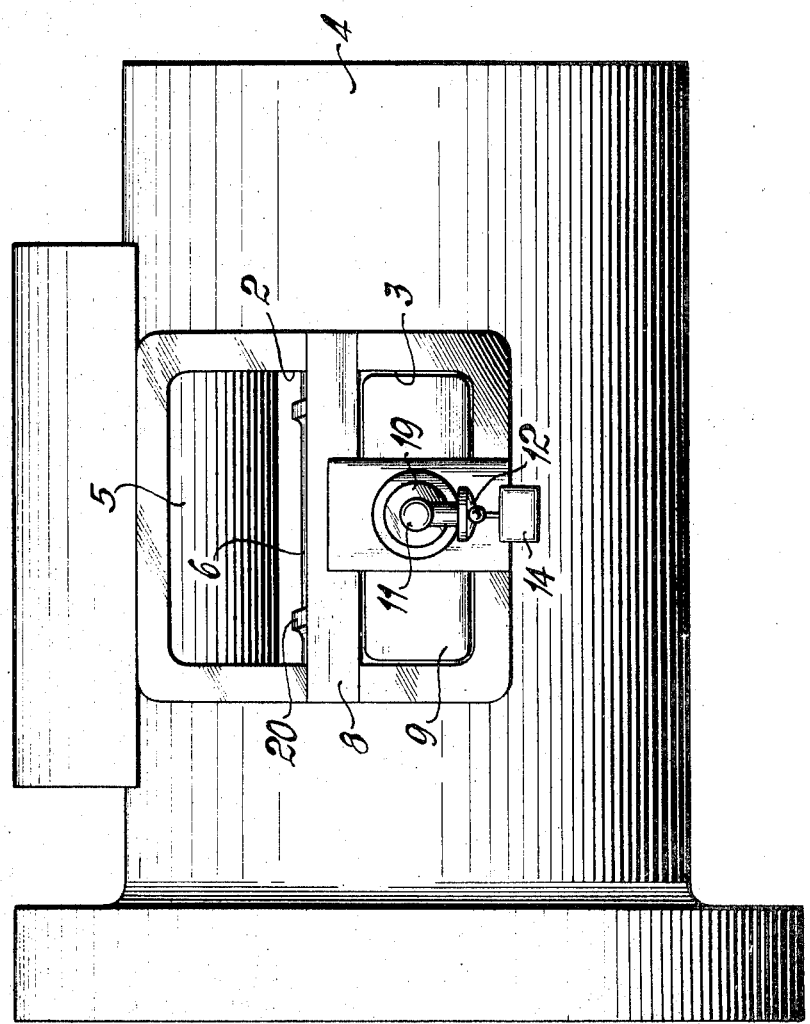

APPARATUS TO CONTROL FEED OF MATERIAL TO AN EXTRUDER

The invention relates to apparatus for controlling the feed of material to a feed hopper of an extruder for processing rubber or plastics material.

A frequently used and successful method of charging an extruder is to feed it with granulated material. By using scales or metering means, the feed can generally be adjusted with sufficient accuracy to allow for varying output of associated processing machines. However, the special granulating machines which are required to granulate the material entail high capital and operating costs.

It has been proposed to use a light source co-operating with photoelectric cells located in a feed hopper of an extruder, and to control the feed of material according to the light falling on the photo-electric cells. Such means for sensing the amount of material in the feed hopper have the drawback that, in cases where the material to be extruded is fed in strip form, one narrow strip can be sufficient to interrupt the light beam to the photo-electric cells, thus preventing any more material from being supplied to the feed hopper even though the hopper is in fact not tightly filled.

Rod type sensing means have also been proposed to project into the feed hopper and sense the volume of the charge. Since such sensing means do not press the material into the hopper but merely sense the filling level at one position, they again fail to ensure that the hopper is compactly filled under pressure up to a certain level, a condition which is absolutely essential if the spirals of the feed screw of the extruder are to be uniformly fed.

According to the invention there is provided control apparatus to control feed of material to an extruder for extruding rubber or plastics material, comprising a housing for a feed screw, a hopper formed as a material feed aperture in the housing and a baffle seated with a tight seal on the feed screw and dividing the material feed aperture into a first portion to receive material to be extruded and a second portion for sensing the amount of material in the hopper.

A pressure loaded control piston is preferably slidably mounted in said second portion of the material feed aperture.

Preferably the first and second portions of the material feed aperture are in communication with one another such that material fed to said first portion is fed into said second portion against the resistance of the pressure loaded piston which maintains material in said second portion in a compacted state.

The control apparatus preferably includes limit switches and a member on the piston rod of the piston to operate the limit switches at upper and lower extremities of the stroke of the piston to control the amount of material supplied to the portion of the feed hopper by means of an adjusting device.

The effect achieved by the apparatus according to the invention is that the material which is fed into the open part of the charging aperture of the extruder is drawn around the processing screw; it then fills the part of the charging aperture closed by the pressure-loaded piston and presses the piston upwards.

Since the piston is under pressure, that part of the feed hopper is filled tightly with material, thus giving 100 percent uniform charging of the processing screw, which is in no way dependent on the form of material fed to the extruder.

The invention is diagrammatically illustrated by way of example in the accompanying drawings, in which:

FIG. 1 is a cross-section through control apparatus according to the invention; and FIG. 2 is a plan view of the control apparatus of FIG. 1, but with no material in the feed hopper.

Referring to the drawings, known material feeding means (not shown), feeds material to be extruded into a material feed aperture provided in a housing 4 and divided by a baffle 8 into a portion 2 and a portion 3. As shown, said known material feeding means (not shown) feeds strips 15 of material to be extruded into the portion 2 and the material is drawn in by a feed roll 5 and by a feed screw 6, which are rotated in the directions indicated by the arrows thereon. The material passes, by way of a passageway 16, around the feed screw 6 and into the portion 3 which comprises a rectangular section chamber 17 in which a piston 9 is slidably received. A doctor knife 7 prevents any material from being drawn around underneath the feed roll 5. As the chamber 17 is filled with material fed through the passageway 16, the piston 9, which is guided by the baffle 8 and a portion 10 of the housing 4, is forced upwards by the pressure of the material. Means of known kind (not shown) act on a piston rod 11, in the direction of the arrow 18, and put the piston 9 under pneumatic or hydraulic pressure. The piston 9 is impinged on with a slightly lower pressure than that which forces the material through the passageway 16 into the chamber 17, thereby ensuring that the material in the chamber 17 is tightly compacted. A stop 19 on the piston rod 11 prevents the piston 9 from touching the feed screw 6 if there should ever be no material in the chamber 17.

The piston rod 11 also carries a projection 12 which, if the chamber 17 becomes almost empty, operates a limit switch 13, causing said known material feeding means (not shown) to supply fresh material to the portion 2 of the material feed aperture.

If the feed of material through the passageway 16 into the chamber 17 causes the piston 9 to be pushed upwards to its uppermost position, the projection 12 operates a limit switch 14, to cause said known material feeding means (not shown) to cease feeding material.

Thus the portion 2 of the aperture is used to feed in the material and the portion 3 is covered by the piston 9. The baffle 8 is seated on the feed screw 6 with a tight seal but without touching the screw, in order to obtain a certain packing action and to allow build up of pressure in the material within the chamber 17.

The baffle 8 enables spirals 20 of the feed screw 6 to be permanently filled with material, thus ensuring absolutely uniform charging of the screw.

What is claimed is:

1. Control apparatus, to control feed of material to be extruded to an extruder, comprising a housing; a feed screw rotatably mounted in said housing; a hopper formed as a material feed aperture in said housing; a baffle seated with a tight seal on said feed screw and dividing said material feed aperture into a first portion to receive material to be extruded and a second portion for sensing the amount of material in said hopper; means communicating said first portion with said second portion whereby material fed to said first portion is fed into said second portion; pressure means to maintain material in said second portion in a compacted state; and sensing means to sense the amount of material in said second portion.

2. Control apparatus as claimed in claim 1, wherein said pressure means comprise a pressure-loaded control piston slidably mounted in said second portion of said material feed aperture.

3. Control apparatus as claimed in claim 2 wherein said sensing means comprise limit switches and a member on the piston rod of said control piston to operate said limit switches at upper and lower extremities of the stroke of said control piston.

4. Control apparatus as claimed in claim 3, wherein said limit switches are adapted to control operation of material feeding means which feed material to said first portion of said material feed aperture.

* * * * *